United States Patent [19]

Bleiman

[11] 3,940,793

[45] Feb. 24, 1976

[54] DISK POSITIONING MEANS FOR A FLEXIBLE MAGNETIC DISK DRIVE APPARATUS

[75] Inventor: Lewis W. Bleiman, Northridge, Calif.

[73] Assignee: Pertec Corporation, Chatsworth, Calif.

[22] Filed: Dec. 18, 1974

[21] Appl. No.: 533,809

[52] U.S. Cl. ................................. 360/99; 274/9 B
[51] Int. Cl.² ................... G11B 5/016; G11B 25/04
[58] Field of Search............ 360/97, 98, 99; 274/9 B

[56] References Cited
UNITED STATES PATENTS
3,770,908   11/1973   Craggs .................................. 360/97
FOREIGN PATENTS OR APPLICATIONS
869,376   5/1961   United Kingdom ................. 274/9 B Primary Examiner—Richard E. Aegerter
Assistant Examiner—Steven L. Stephan
Attorney, Agent, or Firm—Lindenberg, Freilich, Wasserman, Rosen & Fernandez

[57] ABSTRACT

In a flexible magnetic disk drive apparatus including a housing having an entrance slot for receiving a disk carrying cartridge, means for engaging said cartridge to either properly position it relative to a disk clamp and drive mechanism or eject it out through said entrance slot. The means is comprised of a fixed positioning surface or flange located adjacent to said entrance slot and a spring mounted ejector member for engaging the leading edge of said cartridge to urge the cartridge trailing edge against said positioning surface.

7 Claims, 4 Drawing Figures

DISK POSITIONING MEANS FOR A FLEXIBLE MAGNETIC DISK DRIVE APPARATUS

BACKGROUND OF THE INVENTION

This invention relates generally to improvements in flexible magnetic disk drive apparatus and more particularly to means useful in such an apparatus to assure proper positioning of a disk carrying cartridge relative to a disk clamp and drive mechanism.

Recently developed flexible magnetic disks are finding increasing applications as a low cost information storage media. Typically, each disk is carried in a flat, rectangular cartridge having a central opening which exposes an annular portion of the disk surrounding a central disk opening. In use, the cartridge is held stationary while the exposed disk annular portion is clamped and rotated. The disk recording surface is accessible through a radial slot formed in the cartridge for reading and writing.

A portion of a typical flexible disk drive system is disclosed in U.S. Pat. No. 3,768,815 which shows a drive shaft coupled to a hub having a cylindrical wall which defines an internal annular recess and a flat face portion. Also included is a rotatable collet for clamping the central annular portion of the disk against the flat face portion of the hub. Thus, as the hub rotates, the clamped disk rotates therewith.

U.S. patent applications Ser. Nos. 522,220 filed Nov. 8, 1974 and 517,542 filed Oct. 24, 1974 by Lewis W. Bleiman disclose a flexible magnetic disk drive system which includes a hinged door opening into a disk cartridge entrance slot. The door is coupled to the disk clamping mechanism comprised of a drive hub and an expandable collet mounted for movement toward and away from the hub. When the door is open, the collet is moved away from the hub permitting a cartridge to be inserted therebetween. When the door is closed, the collet moves into engagement with the hub thereby clamping the disk annular portion against the hub.

It is, of course, important that the disk be seated in its proper position before the door is closed to prevent damaging the disk as the collet and hub move into engagement. Prior mechanisms for avoiding damage to the disk have utilized relatively complex interlock devices which prevent closure of the door unless the cartridge is properly seated.

SUMMARY OF THE INVENTION

The present invention is directed to a flexible magnetic disk drive apparatus incorporating means for engaging a disk cartridge inserted through an entrance slot so as to properly position the cartridge relative to a disk clamp and drive mechanism.

More particularly, means are provided in accordance with the invention for engaging a disk cartridge so as to either properly seat it relative to the clamp and drive mechanism or eject it out through the entrance slot.

In the preferred embodiment of the invention, the drive system includes a housing having a hinged door opening into a thin, elongated entrance slot for receiving a disk cartridge therethrough. The slot opens into guide means supported in the housing for guiding the cartridge along a defined plane extending between a hub and collet of the disk clamp mechanism. A positioning flange mounted on the housing externally of the entrance slot extends transverse to and intersects the defined plane. A spring mounted ejector member is supported within the housing for resiliently engaging the leading edge of the cartridge to urge the cartridge trailing edge against the positioning flange.

DESCRIPTION OF THE PREFERRED EMBODIMENTS

Figure 1:
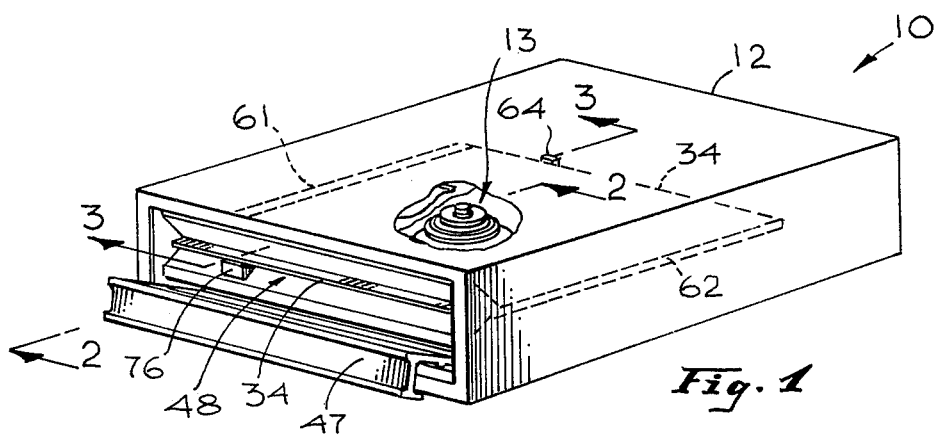
FIG. 1 is a perspective view showing a flexible magnetic disk drive apparatus in accordance with the present invention.

Attention is now directed to the figures which illustrate a flexible disk drive system 10 incorporating features in accordance with the present invention. The system generally consists of a housing 12 containing a disk clamp and drive mechanism 13 and a direct current stepper motor 15 coupled thereto.

Preferably, the motor 15 is comprised of a motor housing 17 having a stator 18 mounted therein. A rotor 19 having a shaft 20 directly physically coupled thereto is mounted in bearings 21 and 22 for rotation with respect to housing 17 and stator 18. An annular hub 24 is fixed to the distal end of the drive shaft 20 by suitable means, such as an appropriate adhesive. The hub 24 includes a substantially cylindrical wall having a flat face portion 25 and defining an internal annular recess 28. A disk clamping member 30 cooperates with the hub 24 to clamp a flexible disk 32 therebetween to rotate the disk as the hub 24 rotates. The disk 32 is contained within a flat rectangular cartridge 34 which is restrained from rotating by fixed guide members. The disk clamping member 30 is mounted on a support shaft 36 supported on an arm 40 mounted for pivotal movement about axis 41. The disk clamping member 30 is comprised of an expandable collet 37 and wedging means 38 carried by the shaft 36 for rotational motion thereabout. The wedging means 38 has a conical external surface 39 which cooperates with the internal conical surface 42 of collet 37. A spring 43 is mounted between the collet 37 and wedging means 38 and acts to urge the collet 37 and wedging means 38 apart so that when the arm 40 is in the unclamped position (dashed line in FIG. 2), the wedging means shoulder 44 engages the collet shoulder 45. When the arm 40 is moved to the clamped position (full line in FIG. 2), the collet flange 46 clamps the disk 32 against the hub face portion 25. As the collet flange 46 engages the hub, the wedging means conical surface 39 moves relative to the collet conical surface 42, against the action of spring 43, to radially expand the collet and center the disk 32 with repsect to the drive shaft 20.

Figure 2:
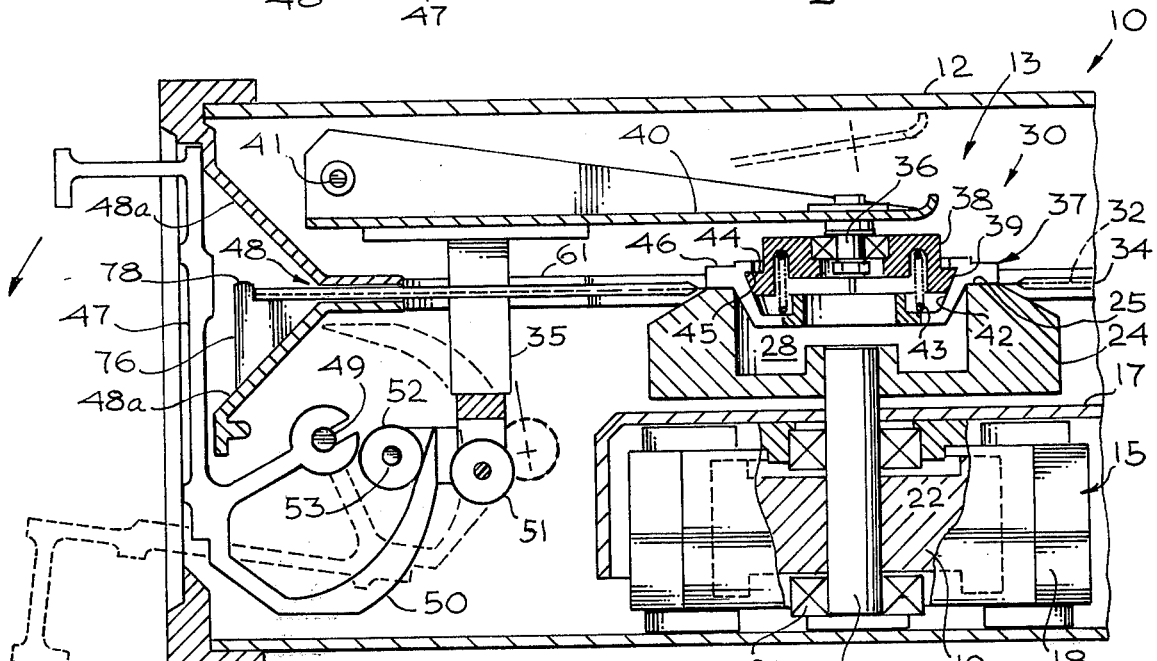
FIG. 2 is a sectional view taken substantially along the plane 2—2 of FIG. 1.

With reference to FIG. 2, it is pointed out that a disk cartridge 34 can be inserted through a front end of the housing 12 by opening a door 47 to the dashed line position to allow insertion of the cartridge through a thin elongated entrance slot 48. V-shaped guide surfaces 48a converge toward the slot 48. The door 47, which is pivotally mounted about an axis 49, carries a cam 50 which can move the clamp arm 40 carrying the clamp member 30 between the disk clamped position shown in full line in FIG. 2 and the unclamped position shown in dashed line. The clamp arm 40 is mounted for pivotal movement about axis 41 and carries a roller-type cam follower 51 which can be moved by the door-mounted cam 50. When the door is fully opened to the dashed line position, the cam follower 51 moves to a position to pivot the clamp arm 40 so that the disk cartridge 34 can be fully inserted into position. When the door is then closed, the clamp arm 40 is pressed down by reason of engagement of a second roller-type cam follower 52 with the other side of the cam 50. The second cam follower 52 is mounted on a long resilient axle 53, so that the cam follower 52 resiliently presses on the cam.

It should be apparent that if the disk cartridge is not properly seated relative to the center line of the drive shaft 20 when the door 47 is pivoted to the closed position, then the disk can be damaged as the collet 37 moves into the recess 28 of hub 24. In order to prevent this possibility, means are provided in accordance with the present invention which act on a cartridge inserted through the entrance slot 48 to either properly position the cartridge relative to the drive shaft 20 or to eject it back through the entrance slot.

Figure 3:
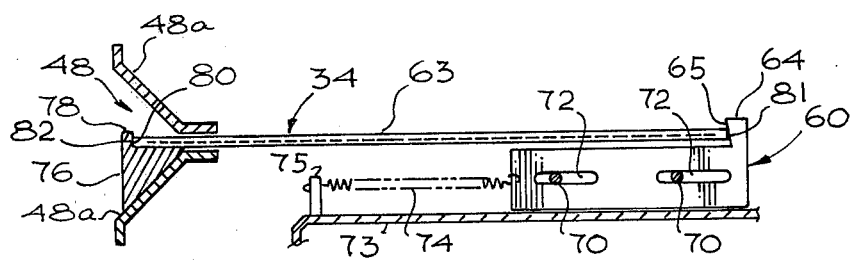
FIG. 3 is a diagrammatic sectional view taken substantially along the plane 3—3 of FIG. 1.
Figure 4:
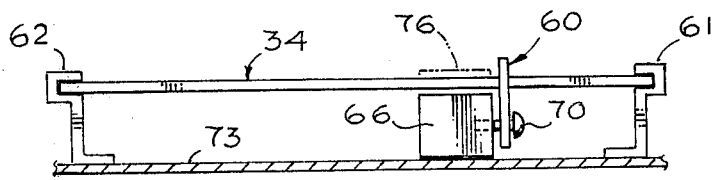
FIG. 4 is a diagrammatic end view of the ejector mechanism looking into the mechanism from the right side of FIG. 3.

More particularly, a cartridge ejection means is provided in accordance with the invention (FIGS. 3 and 4) comprised of an ejector member 60 for resiliently engaging the leading edge of a disk cartridge to urge the cartridge trailing edge to a reference position.

Cartridge guide means, in the form of slotted tracks 61, 62 are mounted in the housing 12 extending rearwardly from the entrance slot 48 for slidably receiving opposite edges of a cartridge. The tracks 61, 62 are positioned so as to guide a cartridge inserted through the slot 48 along a plane 63 extending between the hub 24 and collet 37 when in the open unclamped position. The ejector member 60 is provided with an upstanding projection 64 having a surface 65 extending substantially perpendicular to and intersecting the cartridge plane 63 so that the leading edge of a cartridge engages the surface 65. The ejector member 60 is mounted for slidable movement toward and away from the entrance slot, as on pins 70 fixed to a platen 66 and extending through slots 72 formed in the ejector member 60. The platen is secured to shelf 73 fixed to the housing 12. A spring 74 is connected between the ejector member 60 and a post 75 mounted on shelf 73 tending to prevent rearward movement of the member 60 away from the entrance slot 48.

A positioning block 76 is mounted adjacent to the entrance slot 48, as for example, on guide surface 48a. The positioning block 76 includes a positioning flange 78 defining an engagement surface 80 extending substantially perpendicular to and intersecting the cartridge plane 63. The positioning block 76 is preferably considerably narrower than the elongated dimension of slot 48 to facilitate manual insertion of a cartridge.

In use, the door 47 is manually pivoted to the open dashed line position thereby separating the collet 37 from the hub 24. A disk cartridge 34 is then manually inserted through the entrance slot 48 causing the flexible cartridge to bend slightly around the positioning flange 78 blocking the entrance slot. The slotted guide tracks 61, 62 then guide the cartridge along the substantially flat plane 63 threading between the collet 37 and hub 24 until the leading edge 81 of the cartridge 34 engages the ejector member projection 64. As the cartridge continues to be pushed through the entrance slot 48, the ejector member 60 will slide rearwardly on pins 70 against the spring urging of spring 74. The cartridge 34 continues to be pushed until its trailing edge 82 clears positioning flange 78 and then prior to releasing the cartridge, the user should push the trailing cartridge edge downwardly into plane 63. Thus, when the cartridge is released, the ejector member projection 64 will resiliently bear against the cartridge leading edge to position the cartridge trailing edge against reference surface 80. With the cartridge trailing edge engaged with reference surface 80, the disk will be properly positioned relative to the drive shaft.

It should be recognized that in the event the user fails to insert the cartridge sufficiently far for the cartridge trailing edge 82 to move past the positioning flange 78, then upon release, the cartridge will be immediately ejected out through the entrance slot 48 by the spring urged ejector member 60. As a consequence, the user is prevented from closing the door 47 with a cartridge therein improperly seated.

The embodiments of the invention in which an exclusive property or privilege is claimed are:

1. An apparatus for rotating a flexible magnetic disk contained in a flat flexible cartridge, said apparatus comprising:
   a housing;
   disk clamp means mounted in said housing, said disk clamp means including a drive hub and a clamping member mounted for movement relative thereto between an open spaced apart position and a closed clamping position;
   an entrance slot defined in said housing elongated in a first direction;
   stationary guide means mounted in said housing for guiding a cartridge inserted through said entrance slot along a defined plane extending between said clamping member and drive hub when in said open position;
   positioning means mounted adjacent to said entrance slot providing a fixed reference surface extending substantially transverse to and intersecting said defined plane; and
   ejector means supported in said housing for resiliently bearing against the leading edge of said cartridge to urge the trailing edge of said cartridge against said fixed reference surface.

2. The apparatus of claim 1 including first and second guide surfaces mounted adjacent to and converging toward said entrance slot; and wherein
   the dimension of said positioning means along the elongated direction of said slot is considerably less than the dimension of said slot.

3. The apparatus of claim 1 wherein said ejector means includes an ejector member mounted for linear movement toward and away from said entrance slot, said ejector member defining a surface extending substantially transverse to and intersecting said defined plane; and
   spring means urging said ejector member toward said entrance slot.

4. The apparatus of claim 1 including a door mounted on said housing adjacent to said entrance slot and movable between an open and closed position; and
   means responsive to the position of said door for moving said clamping member to said clamping position when said door is closed and to said spaced apart position when said door is open.

5. In an apparatus for rotating a flexible magnetic disk contained in a flat flexible cartridge and including a housing having a thin entrance slot elongated in a first direction for receiving said cartridge, the improvement comprising:

an ejector member mounted in said housing for reciprocal movement toward and away from said entrance slot, said ejector member defining an engagement surface aligned with said entrance slot;

spring means coupled to said ejector member urging it toward said entrance slot;

stationary guide means in said housing for guiding a cartridge inserted through said slot along a defined plane toward said ejector member for engaging the leading edge of said cartridge against said ejector member engagement surface to move said ejector member away from said entrance slot against said spring urging; and positioning means mounted adjacent to said entrance slot providing a fixed reference surface extending substantially transverse to and intersecting said defined plane.

6. The apparatus of claim 5 wherein said positioning means comprises a block defining said reference surface; and wherein the dimension of said block along the elongated direction of said slot is less than the dimension of said slot.

7. The apparatus of claim 6 including first and second guide surfaces mounted adjacent to and converging toward said entrance slot.

* * * * *